United States Patent
Moura et al.

(10) Patent No.: US 10,605,169 B2
(45) Date of Patent: Mar. 31, 2020

(54) COMBUSTOR PANEL COOLING ARRANGEMENTS

(71) Applicant: United Technologies Corporation, Farmington, CT (US)

(72) Inventors: Dennis M. Moura, South Windsor, CT (US); James B. Hoke, Tolland, CT (US); Reza Rezvani, Bolton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 423 days.

(21) Appl. No.: 15/490,189

(22) Filed: Apr. 18, 2017

(65) Prior Publication Data

US 2018/0298819 A1  Oct. 18, 2018

(51) Int. Cl.
*F02C 7/12* (2006.01)
*F23R 3/00* (2006.01)
*F23R 3/16* (2006.01)
*F23R 3/06* (2006.01)

(52) U.S. Cl.
CPC ........... *F02C 7/12* (2013.01); *F23R 3/002* (2013.01); *F23R 3/06* (2013.01); *F23R 3/16* (2013.01); *F05D 2220/32* (2013.01); *F05D 2240/35* (2013.01); *F05D 2260/202* (2013.01); *F05D 2260/22141* (2013.01); *F23R 2900/03041* (2013.01)

(58) Field of Classification Search
CPC .... F02C 7/12; F23R 3/002; F23R 3/04; F23R 3/045; F23R 3/06; F23R 3/16; F23R 2900/03041–03045; F05D 2260/22141
See application file for complete search history.

(56) References Cited

U.S. PATENT DOCUMENTS

| | | | | |
|---|---|---|---|---|
| 4,158,949 | A | * | 6/1979 | Reider ............... F23R 3/50 60/737 |
| 7,000,397 | B2 | | 2/2006 | Pidcock et al. |
| 7,748,221 | B2 | | 7/2010 | Patel et al. |
| 2003/0101731 | A1 | * | 6/2003 | Burd ............... F23M 5/02 60/796 |
| 2010/0212324 | A1 | | 8/2010 | Bronson et al. |

(Continued)

FOREIGN PATENT DOCUMENTS

| GB | 2247522 A | 3/1992 |
|---|---|---|
| WO | 2015038259 A1 | 3/2015 |

OTHER PUBLICATIONS

European Search Report, European Application No. 18167844.2, dated Sep. 19, 2018, European Patent Office; European Search Report 7 pages.

*Primary Examiner* — Steven M Sutherland
(74) *Attorney, Agent, or Firm* — Cantor Colburn LLP

(57) ABSTRACT

Combustor panels for use in gas turbine engine combustors having a panel body having a peripheral rail around a periphery of the panel body, a first boss formed on the panel body and surrounding a first aperture that passes through the panel body, and a first webbing that extends from the peripheral rail toward the first boss. A first annular channel is formed between the first webbing and the first boss and surrounds the first boss and a first web pocket is formed within the first webbing between the peripheral rail and the first boss and defines a local extension of the first annular channel extending from the first boss to the peripheral rail.

20 Claims, 11 Drawing Sheets

(56) References Cited

U.S. PATENT DOCUMENTS

| | | |
|---|---|---|
| 2014/0033723 A1 | 2/2014 | Doerr et al. |
| 2015/0135720 A1* | 5/2015 | Papple .................... F01D 5/186 |
| | | 60/759 |
| 2015/0345789 A1 | 12/2015 | Papple et al. |
| 2016/0010559 A1 | 1/2016 | Hoke et al. |
| 2016/0186994 A1 | 6/2016 | Bouldin et al. |
| 2016/0201913 A1 | 7/2016 | Tu et al. |
| 2016/0208704 A1 | 7/2016 | Bouldin et al. |
| 2016/0238253 A1 | 8/2016 | Moura et al. |
| 2016/0265777 A1 | 9/2016 | Hoke et al. |

\* cited by examiner

COMBUSTOR PANEL COOLING ARRANGEMENTS

BACKGROUND

The subject matter disclosed herein generally relates to panels for combustors in gas turbine engines and, more particularly, to bosses and cooling arrangements for combustor panels within gas turbine engines.

A combustor of a gas turbine engine may be configured and required to burn fuel in a minimum volume. Such configurations may place substantial heat load on the structure of the combustor (e.g., panels, shell, etc.). Such heat loads may dictate that special consideration is given to structures which may be configured as heat shields or panels configured to protect the walls of the combustor, with the heat shields being air cooled. Even with such configurations, excess temperatures at various locations may occur leading to oxidation, cracking, and high thermal stresses of the heat shields or panels. As such, impingement and convective cooling of panels of the combustor wall may be used. Convective cooling may be achieved by air that is trapped between the panels and a shell of the combustor. Impingement cooling may be a process of directing relatively cool air from a location exterior to the combustor toward a back or underside of the panels.

Thus, combustor liners and heat shields are utilized to face the hot products of combustion within a combustion chamber and protect the overall combustor shell. The combustor liners are supplied with cooling air including dilution passages which deliver a high volume of cooling air into a hot flow path. Dilution passages include a boss which extends beyond a hot side face of the liner. Other features in the combustor may have liners with bosses. It may be difficult to cool the bosses, and thus combustor liner boss cooling may be advantageous.

SUMMARY

According to some embodiments, combustor panels for use in gas turbine engine combustors are provided. The combustor panels include a panel body having a peripheral rail around a periphery of the panel body, a first boss formed on the panel body and surrounding a first aperture that passes through the panel body, and a first webbing that extends from the peripheral rail toward the first boss. A first annular channel is formed between the first webbing and the first boss and surrounds the first boss and a first web pocket is formed within the first webbing between the peripheral rail and the first boss and defines a local extension of the first annular channel extending from the first boss to the peripheral rail.

In addition to one or more of the features described above, or as an alternative, further embodiments of the combustor panel may include at least one rail through-hole providing fluid connection through the peripheral rail into the first web pocket.

In addition to one or more of the features described above, or as an alternative, further embodiments of the combustor panel may include at least one rail recess formed in a surface of the peripheral rail providing fluid connection through the peripheral rail into the first web pocket.

In addition to one or more of the features described above, or as an alternative, further embodiments of the combustor panel may include at least one panel through-hole providing fluid connection through the panel body into the first web pocket.

In addition to one or more of the features described above, or as an alternative, further embodiments of the combustor panel may include that the first aperture is a dilution hole of a combustor.

In addition to one or more of the features described above, or as an alternative, further embodiments of the combustor panel may include a second boss formed on the panel body and surrounding a second aperture that passes through the panel body and a second webbing that extends from the first boss toward the second boss. A second web pocket is formed within the second webbing between the first boss and the second boss and defines a local extension of the first annular channel extending from the first boss toward second boss.

In addition to one or more of the features described above, or as an alternative, further embodiments of the combustor panel may include that a second annular channel is formed between the second webbing and the second boss and surrounds the second boss, and wherein the second web pocket is a local extension of the second annular channel.

In addition to one or more of the features described above, or as an alternative, further embodiments of the combustor panel may include a plurality of first bosses defining a plurality of first apertures and a plurality of second bosses defining a plurality of second apertures.

In addition to one or more of the features described above, or as an alternative, further embodiments of the combustor panel may include at least one heat transfer augmentation feature within the first web pocket.

In addition to one or more of the features described above, or as an alternative, further embodiments of the combustor panel may include that the at least one heat transfer augmentation feature comprises at least one of a pin, a fin, or a rib.

According to some embodiments, combustors of gas turbine engines are provided. The combustors include a combustor shell and at least one combustor panel mounted to the combustor shell. The at least one combustor panel includes a panel body having a peripheral rail around a periphery of the panel body, a first boss formed on the panel body and surrounding a first aperture that passes through the panel body, and a first webbing that extends from the peripheral rail toward the first boss. A first annular channel is formed between the first webbing and the first boss and surrounds the first boss and a first web pocket is formed within the first webbing between the peripheral rail and the first boss and defines a local extension of the first annular channel extending from the first boss to the peripheral rail.

In addition to one or more of the features described above, or as an alternative, further embodiments of the combustor may include that the panel body further includes at least one rail through-hole providing fluid connection through the peripheral rail into the first web pocket.

In addition to one or more of the features described above, or as an alternative, further embodiments of the combustor may include that the panel body further includes at least one rail recess formed in a surface of the peripheral rail providing fluid connection through the peripheral rail into the first web pocket.

In addition to one or more of the features described above, or as an alternative, further embodiments of the combustor may include that the panel body further includes at least one panel through-hole providing fluid connection through the panel body into the first web pocket.

In addition to one or more of the features described above, or as an alternative, further embodiments of the combustor may include that the first aperture is a dilution hole of the combustor.

In addition to one or more of the features described above, or as an alternative, further embodiments of the combustor may include that the panel body further includes a second boss formed on the panel body and surrounding a second aperture that passes through the panel body and a second webbing that extends from the first boss toward the second boss. A second web pocket is formed within the second webbing between the first boss and the second boss and defines a local extension of the first annular channel extending from the first boss toward second boss.

In addition to one or more of the features described above, or as an alternative, further embodiments of the combustor may include that a second annular channel is formed between the second webbing and the second boss and surrounds the second boss, and wherein the second web pocket is a local extension of the second annular channel.

In addition to one or more of the features described above, or as an alternative, further embodiments of the combustor may include at least one heat transfer augmentation feature within the first web pocket.

In addition to one or more of the features described above, or as an alternative, further embodiments of the combustor may include that the at least one heat transfer augmentation feature comprises at least one of a pin, a fin, or a rib.

In addition to one or more of the features described above, or as an alternative, further embodiments of the combustor may include that the at least one heat transfer augmentation features comprises a heat transfer augmentation feature extending from the combustor shell into the first web pocket and a heat transfer augmentation feature extending from the panel body into the first web pocket.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
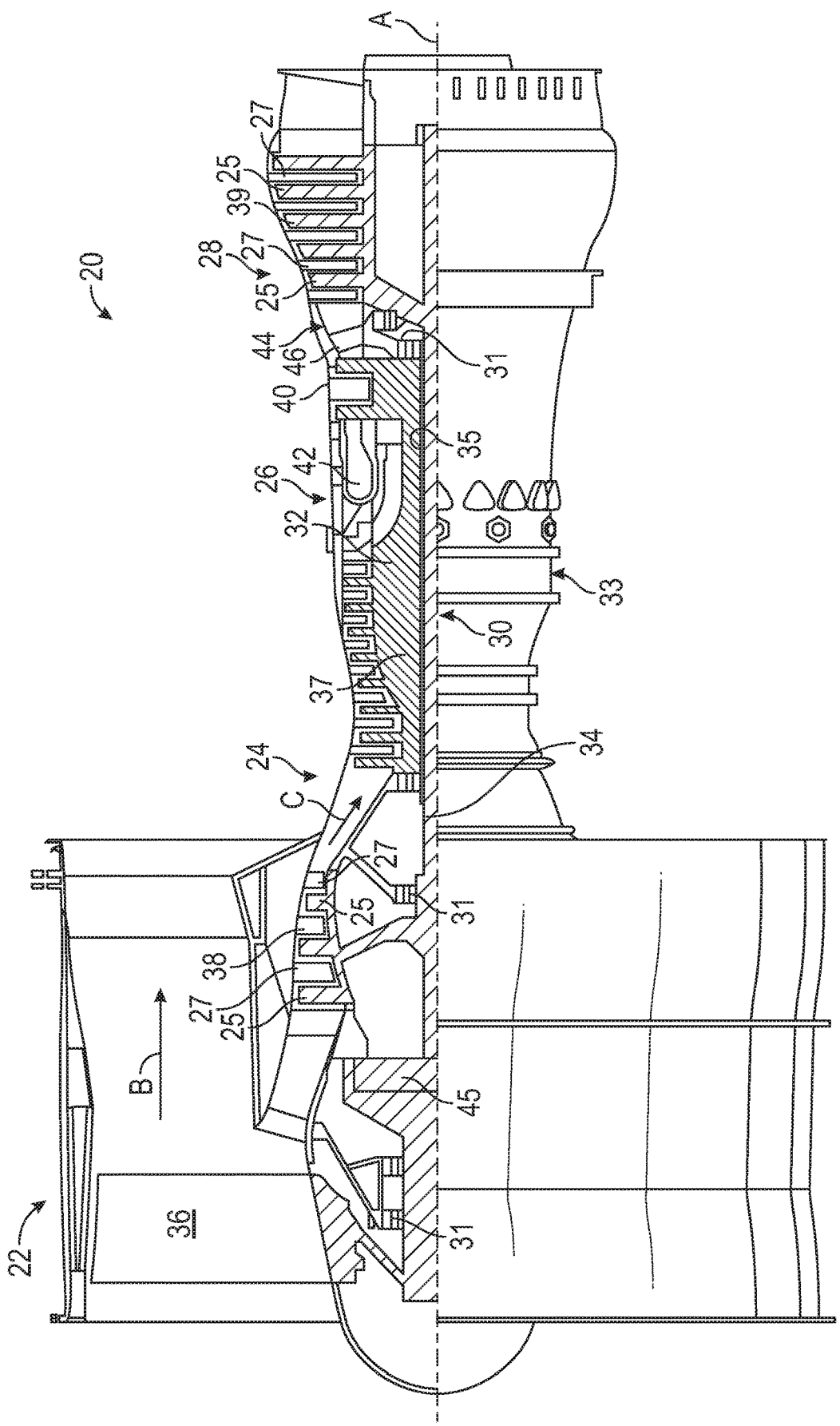
FIG. 1 is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 schematically illustrates a gas turbine engine 20. The gas turbine engine 20, as shown, is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, single-spool, three-spool, etc. engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}\ R)/(518.7°\ R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2A:
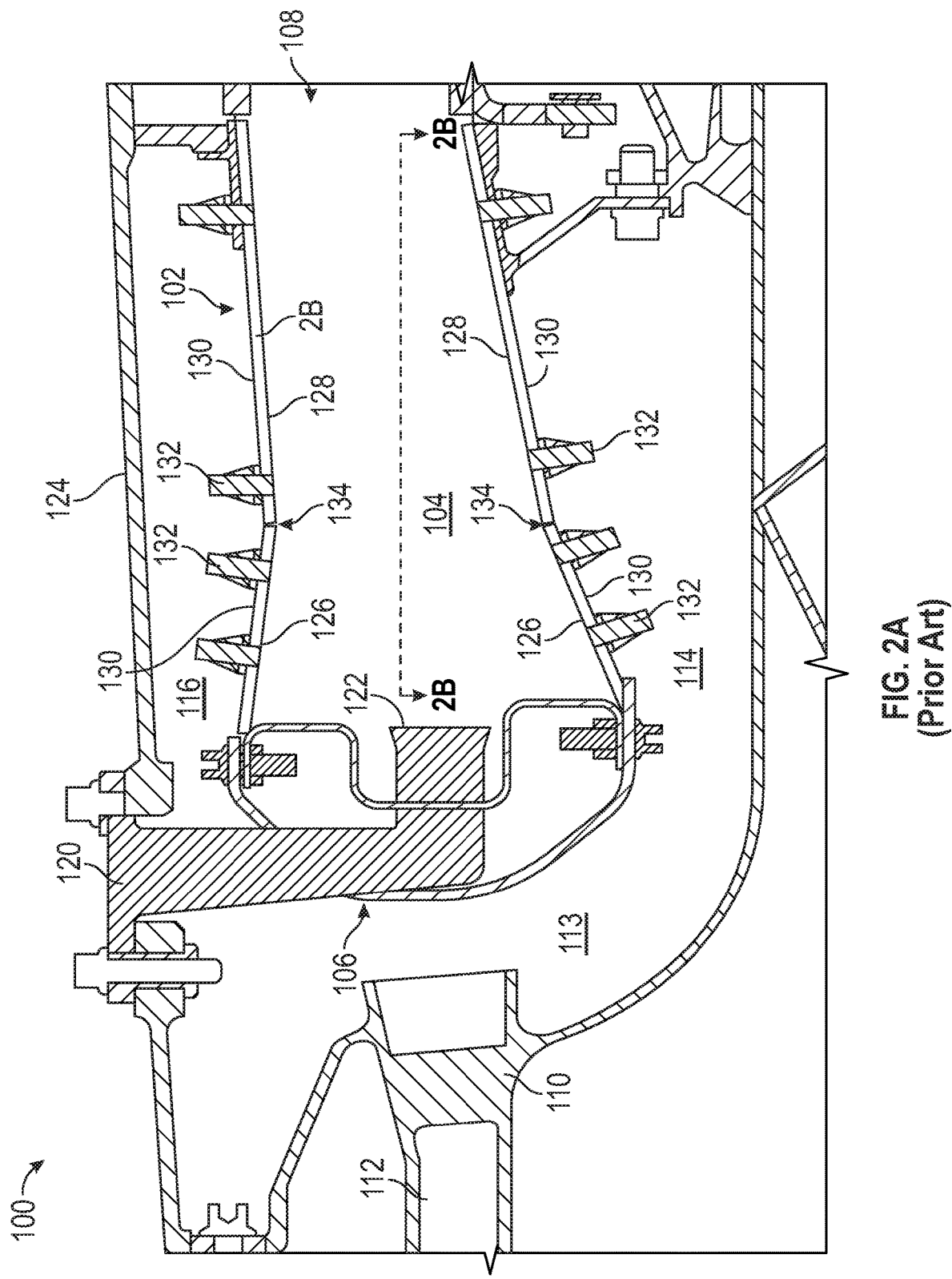
FIG. 2A is a schematic illustration of a combustor section of a gas turbine engine that may employ various embodiments disclosed herein.

FIG. 2A is a schematic illustration of a configuration of a combustion section 100 of a gas turbine engine. As shown, a combustor 102 defines a combustion chamber 104. The combustor 102 includes an inlet 106 and an outlet 108 through which air may pass. The air may be supplied to the combustor 102 by a pre-diffuser 110.

In the configuration shown in FIG. 2A, air is supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud chamber 113 that contains the combustor 102 and includes an inner diameter branch 114 and an outer diameter branch 116. As air enters the shroud chamber 113 a portion of the air may flow into the combustor inlet 106, a portion may flow into the inner diameter branch 114, and a portion may flow into the outer diameter branch 116. The air from the inner diameter branch 114 and the outer diameter branch 116 may then enter the combustion chamber 104 by means of one or more nozzles, holes, apertures, etc. The air may then exit the combustion chamber 104 through the combustor outlet 108. At the same time, fuel may be supplied into the combustion chamber 104 from a fuel injector 120 and a pilot nozzle 122, which may be ignited within the combustion chamber 104. The combustor 102 of the engine combustion section 100 may be housed within a shroud case 124 which may define the shroud chamber 113.

Figure 2B:
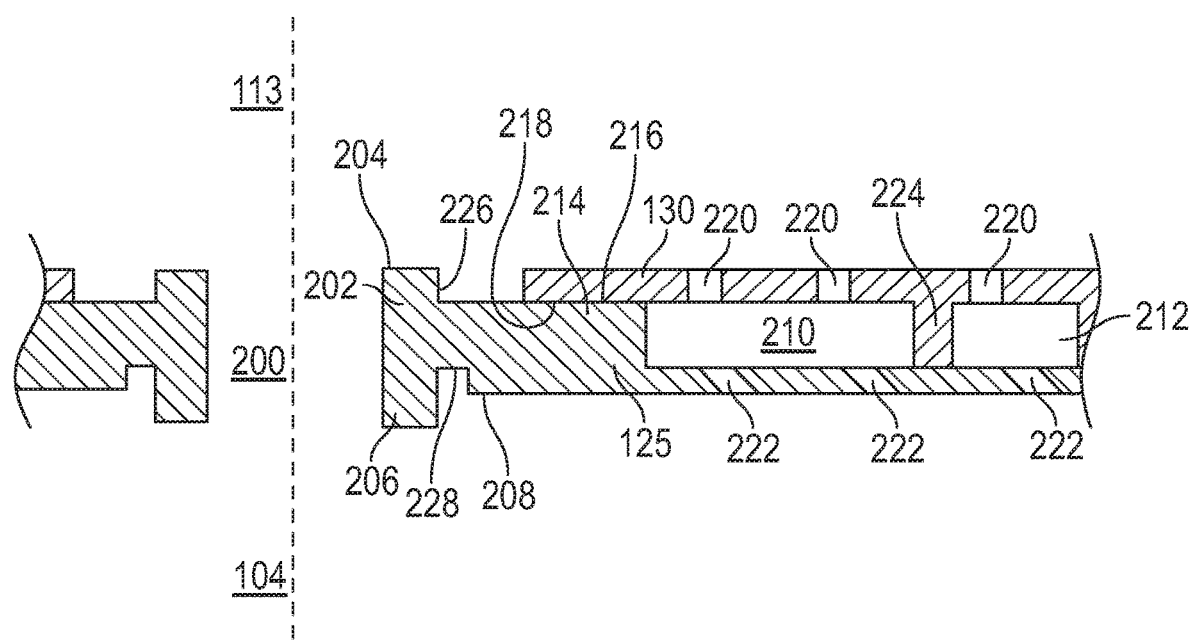
FIG. 2B is a schematic illustration of a cross-section of a combustor liner of the combustor section of FIG. 2A.

The combustor 102, as shown in FIGS. 2A-2B, includes multiple panels 126, 128 that are mounted on an interior surface of one or more shells 130 and are arranged parallel to the shells 130. The shells 130 can define circular or annular structures with the panels 126, 128 being mounted on an inner diameter shell and an outer diameter shell, as will be appreciated by those of skill in the art. The panels 126, 128 can be removably mounted to the shell 130 by one or more attachment mechanisms 132. In some embodiments, the attachment mechanism 132 may be integrally formed with a respective panel 126, 128, although other configurations are possible. In some embodiments, the attachment mechanism 132 may be a bolt or other structure that may extend from the respective panel 126, 128 through the interior surface to a receiving portion or aperture of the shell 130 such that the panel 126, 128 may be attached to the shell 130 and held in place.

The panels 126, 128 include a plurality of cooling holes and/or apertures to enable fluid, such as gases, to flow from areas external to the combustion chamber 104 into the combustion chamber 104. Impingement cooling may be provided from the shell-side of the panels 126, 128, with hot gases may be in contact with the combustion-side of the panels 126, 128. That is, hot gases may be in contact with a surface of the panels 126, 128 that is facing the combustion chamber 104.

First panels 126 may be configured about the inlet 106 of the combustor 102 and may be referred to as forward panels. Second panels 128 may be positioned axially rearward and adjacent the first panels 126, and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art. As such, axially extending gaps may be formed between two circumferentially adjacent first panels 126 and between two circumferentially adjacent second panels 128.

Turning now to FIG. 2B, an enlarged schematic illustration of a portion of the shell 130 and a panel 125 (e.g., first or second panel 126, 128) mounted thereto is shown. The enlarged portion of FIG. 2A is indicated in the dashed circle labeled 2B. As shown in FIG. 2B, a dilution passage 200 has a boss 202 extending between a boss outer end 204 and a boss inner end 206. The dilution passage 200 is an aperture or through-hole that passes through both the shell 130 and the panel 125 and is arranged to allow for dilution air into the combustion chamber 104, as will be appreciated by those of skill in the art. The panel 125 has an inner face 208 facing the hot products of combustion in the combustion chamber 104.

Cooling cavities 210, 212 are provided spaced from a sealing area 214 which has an upper contact surface 216 which is spaced inwardly from the boss outer end 204. The cooling cavities 210, 212 are spaced from the sealing area 214 in a direction away from the boss 202. As can be seen, the upper contact surface 216 seals against an inner surface 218 of the shell 130. Such contact of the contact surfaces 216, 218 seals the cooling cavities 210, 212 from the shroud chamber 113. Air is injected into cooling cavities 210, 212 through impingement holes 220 and then through panel holes 222 in the panel 125 to provide film cooling along the inner face 208 of the panel 125. Further, in some embodiments, and as shown in FIG. 2B, ribs 224 can separate the cavities 210, 212.

With the arrangement shown in FIG. 2B, having an upper contact surface 216 extending from a peripheral surface 226 of the boss 202 to a location which contacts the inner contact surface 218, there is a relatively thick amount of material across the sealing area 214. The relatively thick section at the sealing area can be difficult to cool and can result in stresses at the inner face 208 of the panel 125. As shown in FIG. 2B, a recess 228 can be provided that extends inwardly at the inner face 208 and about the peripheral surface 226.

The panel 125 (or first and second panels 126, 128) can include large apertures (e.g., dilution passage 200 or other through-holes) to accommodate flow addition (e.g., for cooling and/or mixing in the combustion chamber 104), enable mounting, and/or for mating to other hardware (e.g., mounting to ignitors, fuel nozzles, etc.). These apertures are often manufactured with bosses (e.g., boss 202) surrounding the aperture to enable sealing or facilitate manufacturability. The additional mass created by these bosses (e.g., at sealing area 214) create areas that can be difficult to cool by traditional means. Furthermore, in regions where these bosses come in close proximity to other features (e.g., rails, ribs, grommets, bosses, etc.), the area between the multiple features may become conjoined to facilitate manufacturing (e.g. casting) and thus may have a relatively large material thickness. Accordingly, challenges in the placement of local cooling can be created and such arrangements can lead to elevated part temperatures. The high temperatures can shorten part life.

Figure 3A:
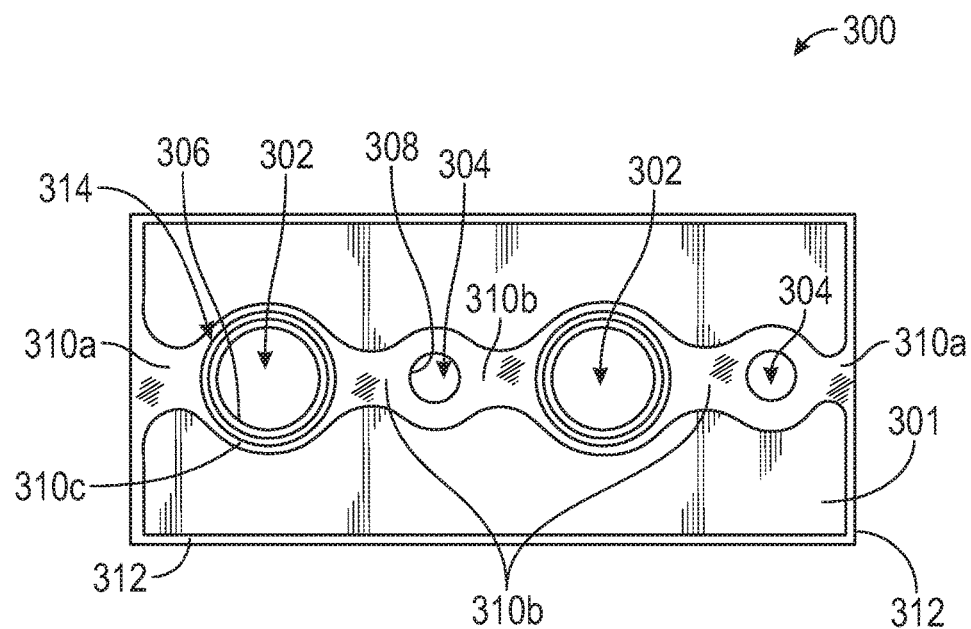
FIG. 3A is a schematic illustration of a combustor panel that can implement embodiments of the present disclosure.
Figure 3B:
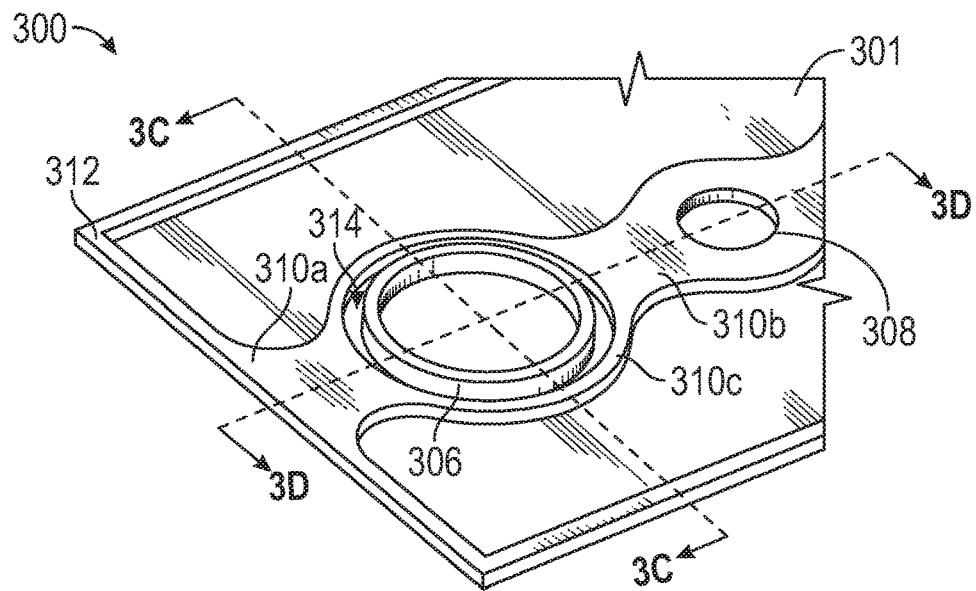
FIG. 3B is an isometric illustration of a portion of the combustor panel of FIG. 3A.
Figure 3C:
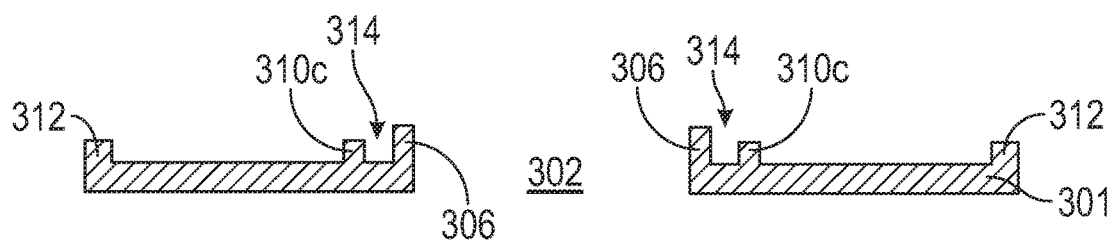
FIG. 3C is a cross-sectional illustration of the combustor panel of FIG. 3A as viewed along the line C-C shown in FIG. 3B.
Figure 3D:
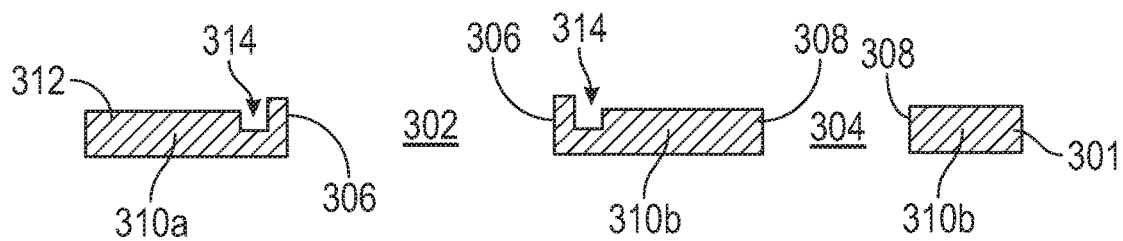
FIG. 3D is a cross-sectional illustration of the combustor panel of FIG. 3A as viewed along the line D-D shown in FIG. 3B.

Turning now to FIGS. 3A-3D, schematic illustrations of a combustor panel 300 formed in a traditional process is shown. FIG. 3A is a top-down plan illustration of the combustor panel 300, FIG. 3B is a partial isometric illustration of the combustor panel 300, FIG. 3C is a cross-sectional illustration of the combustor panel 300 as viewed along the line C-C of FIG. 3B, and FIG. 3D is a cross-sectional illustration of the combustor panel 300 as viewed along the line D-D of FIG. 3B. The combustor panel 300 has a panel body 301 that includes one or more first apertures 302 and one or more second apertures 304 that are be provided to allow airflow to pass through the combustor panel 300. The first apertures 302 are formed by first boss 306 and the second apertures 304 are formed by second boss 308 that define the size, angle, and shape of the respective apertures 302, 304. Although the combustor panel 300 of FIGS. 3A-3D is shown with four apertures 302, 304, those of skill in the art will appreciate that combustor panels may have any number of apertures, and further can include effusion holes, diffusion holes, quench jets, etc. without departing from the scope of the present disclosure.

As shown in FIGS. 3A-3B, the combustor panel 300 includes webbing 310a, 310b, 310c that, in part, defines the boss 306, 308. As shown, the webbing 310a, 310b, 310c can form a continuous structure that extends across the combustor panel 300 between a peripheral rail 312 at a peripheral edge of the combustor panel 300, with the boss 306, 308 and apertures 302, 304 formed within the webbing 310a, 310b, 310c. First webbing 310a is formed between a boss 306, 308 and the peripheral rail 312 and second webbing 310b is formed between adjacent boss 306, 308, as illustratively shown in FIG. 3A. Third webbing 310c, as shown, is a portion of the webbing that surrounds the first apertures 302 and an annular channel 314 is formed between the third webbing 310c and the first boss 306. The annular channel 314 is arranged to enable cooling air to migrate from a cooling source, through effusion holes, and then into the combustion chamber (see, e.g., FIG. 4). As shown, the webbing, and in particular the first and second webbing 310a, 310b, can result in areas of high temperature on the combustor panel 300 because of an increase in thickness of the material of the combustor panel 300 at the webbing 310a, 310b, as shown in FIG. 3C-3D.

Figure 4:
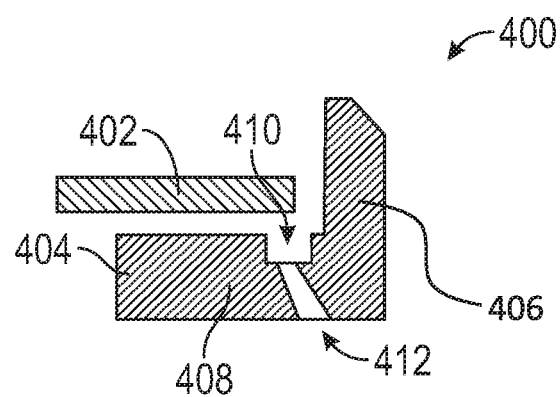
FIG. 4 is a schematic illustration of a combustor panel and combustor shell arrangement that can implement embodiments of the present disclosure.

Turning now to FIG. 4, a schematic illustration of a portion of a combustor panel 400 as attached to a combustor shell 402 is shown. The combustor panel 400 has a peripheral rail 404 and a boss 406 that defines an aperture within the combustor panel 400. As shown in FIG. 4, a webbing 408 extends between the peripheral rail 404 and the boss 406. An annular channel 410 is formed between the webbing 408 and the boss 406 (similar to annular channel 314 shown in FIGS. 3A-3D). In the configuration of FIG. 4, the annular channel 410 allows for cooling air to flow through and between the combustor panel 400 and the combustor shell 402. For example, as shown in FIG. 4, the annular channel 410 includes a cooling hole 412 (e.g., an effusion hole) fluidly connected thereto. The annular channel 410 enables the placement of one or more cooling holes 412 to provide cooling around the boss 406. However, such solution may not sufficiently cool the webbing 408, and thus high temperature areas may still exist on the combustor panel 400 in the uncooled mass of the webbing 408.

Accordingly, embodiments provided herein are directed to provide cooling to combustor panels, and particularly to webbing of combustor panels. Various embodiments of the present disclosure provide a web pocket that enables cooling air to reach the conjoined areas between features (e.g. bosses, rail, etc.) and enables venting via cooling holes into the combustion chamber. The cooling air can be fed from annular channels formed around the bosses or can be fed via dedicated cooling slots/holes (e.g., impingement holes) in the combustor shell directly adjacent the web pocket. Further, in accordance with some embodiments, the web pocket can include heat transfer augmentation features such as pins, fins, ribs, etc. to improve local heat rejection and cooling of the combustor panel at traditionally high temperature areas.

Figure 5A:
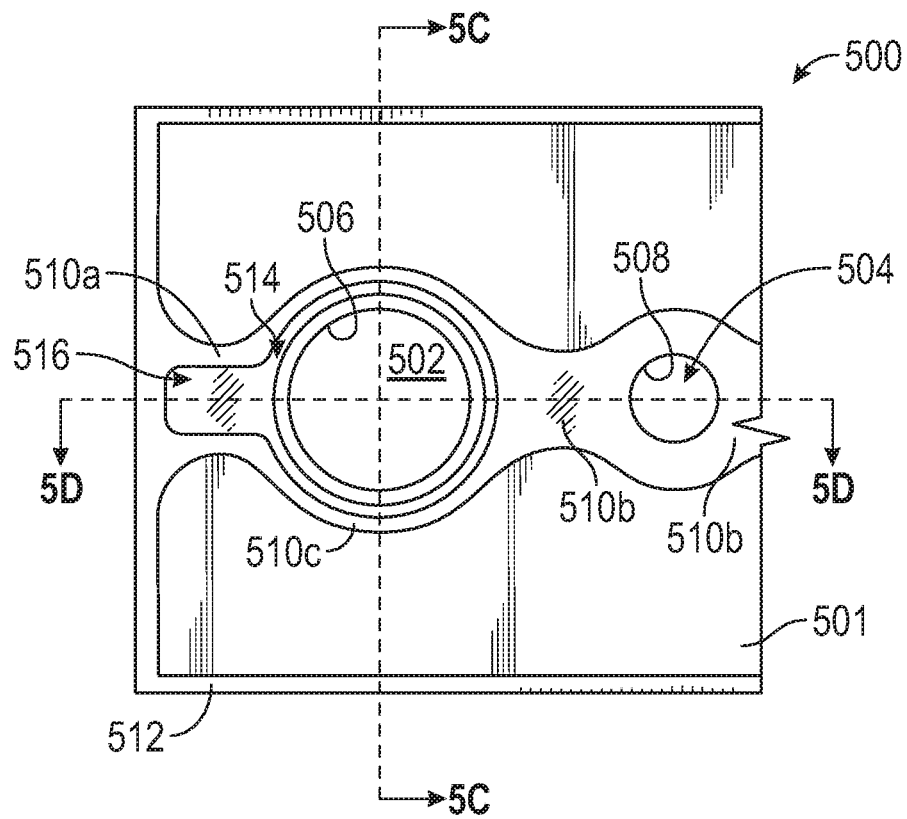
FIG. 5A is a plan view, schematic illustration of a combustor panel in accordance with an embodiment of the present disclosure.
Figure 5B:
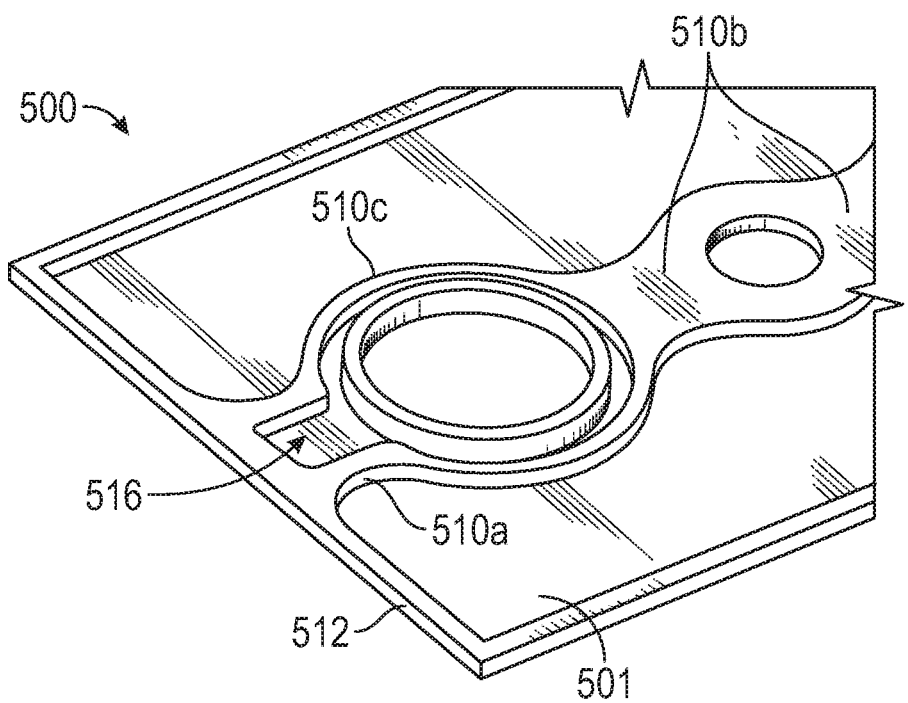
FIG. 5B is an isometric illustration of a portion of the combustor panel of FIG. 5A.
Figure 5C:
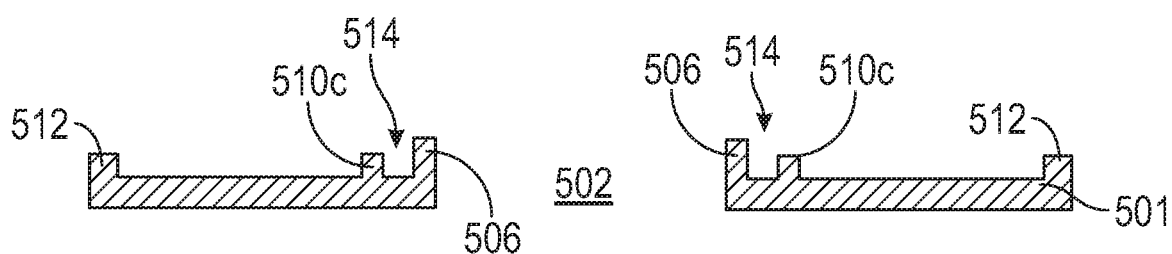
FIG. 5C is a cross-sectional illustration of the combustor panel of FIG. 5A as viewed along the line C-C shown in FIG. 5A.
Figure 5D:
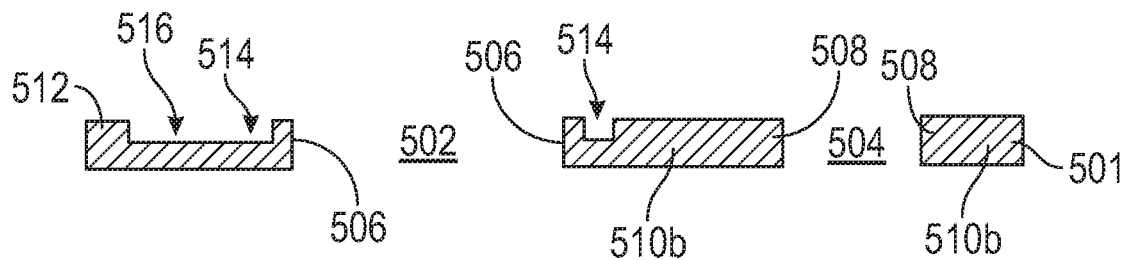
FIG. 5D is a cross-sectional illustration of the combustor panel of FIG. 5A as viewed along the line D-D shown in FIG. 5A.

Turning now to FIGS. 5A-5D, schematic illustrations of a combustor panel 500 in accordance with an embodiment of the present disclosure is shown. FIG. 5A is a top-down plan illustration of a portion of a panel body 501 of the combustor panel 500, FIG. 5B is a partial isometric illustration of the combustor panel 500, FIG. 5C is a cross-sectional illustration of the combustor panel 500 as viewed along the line C-C of FIG. 5A, and FIG. 5D is a cross-sectional illustration of the combustor panel 500 as viewed along the line D-D of FIG. 5A. The combustor panel 500 includes one or more first apertures 502 and one or more second apertures 504 that can be provided to allow airflow to pass through the combustor panel 500. The first apertures 502 are formed by first bosses 506 and the second apertures 504 are formed by second bosses 508 that define the size, angle, and shape of the respective apertures 502, 504. Although the combustor panel 500 of FIGS. 5A-5D is shown with two apertures 502, 504, those of skill in the art will appreciate that combustor panels may have any number of apertures, and further can include effusion holes, dilution holes, diffusion holes, quench jets, etc. without departing from the scope of the present disclosure.

As shown in FIGS. 5A-5D, the combustor panel 500 includes webbing 510a, 510b, 510c that defines, in part, the bosses 506, 508. As shown, the webbing 510a, 510b, 510c can form a continuous structure, as described above, extending between a peripheral rail 512 at a peripheral edge of the combustor panel 500, with the bosses 506, 508 and apertures 502, 504 formed within the webbing 510a, 510b, 510c. First webbing 510a is formed between a boss 506, 508 and the peripheral rail 512 and second webbing 510b is formed between adjacent bosses 506, 508, as illustratively shown in FIGS. 5A-5B. Third webbing 510c, as shown, is a portion of the webbing that surrounds the first apertures 502 and an annular channel 514 is formed between the third webbing 510c and the first boss 506. The annular channel 514 is arranged to enable cooling air to migrate from a cooling source, through effusion holes, and then into the combustion chamber.

To reduce the high temperature area within the first webbing 510a, the first webbing 510a is formed with a web pocket 516 that extends from the annular channel 514 toward the peripheral rail 512. The web pocket 516 is a local extension of the annular channel 514 in the area of the first webbing 510a. The web pocket 516 enables cooling air to enter between a combustor shell and the combustor panel 500 at the located of the first webbing 510a. Accordingly, the combustor panel 500 may not experience high temperatures along the peripheral rail 512 at the first webbing 510a.

Figure 6A:
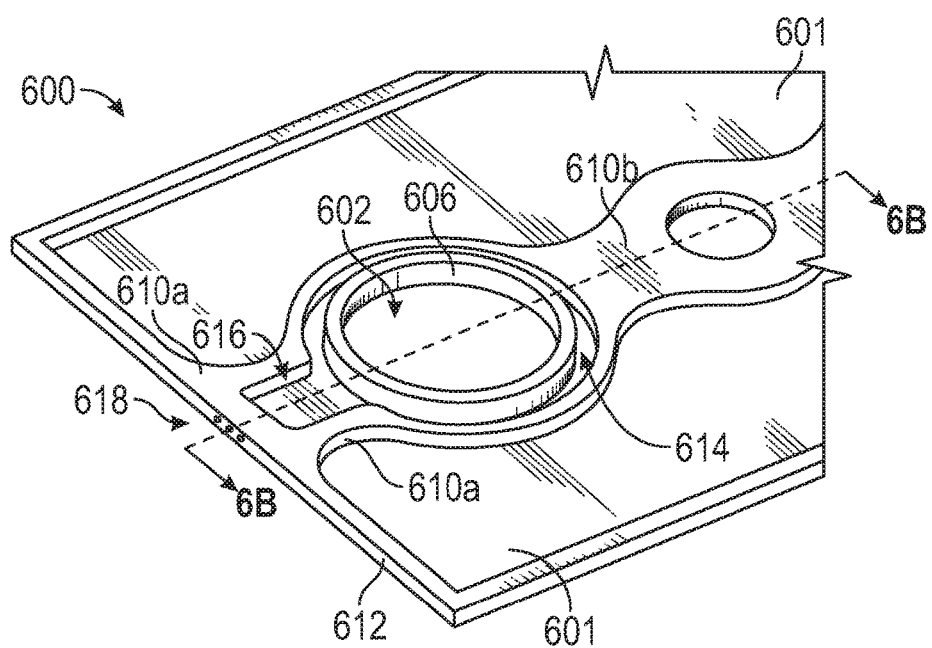
FIG. 6A is an isometric illustration of a combustor panel in accordance with an embodiment of the present disclosure.
Figure 6B:
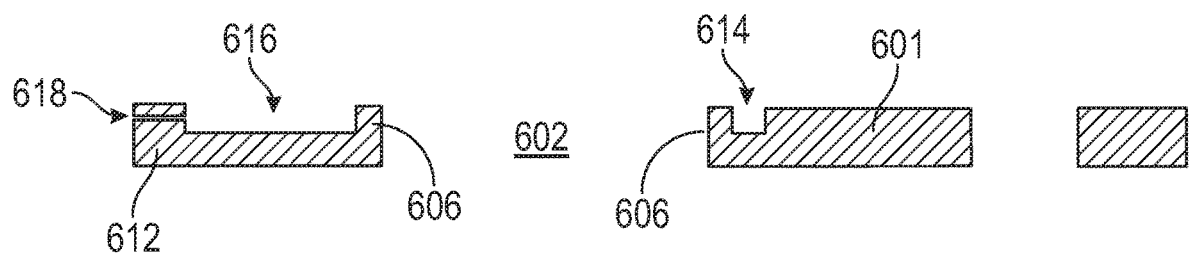
FIG. 6B is a cross-sectional illustration of the combustor panel of FIG. 6A as viewed along the line B-B shown in FIG. 6A.

Turning now to FIGS. 6A-6B, an alternative arrangement of a combustor panel 600 in accordance with an embodiment of the present disclosure is shown. The combustor panel 600 having a panel body 601 is substantially similar to that shown and described with respect to combustor panel 500 of FIGS. 5A-5D, and thus similar features will be labeled with similar reference numbers. Further, various elements that are schematically shown will not be labeled or described again for simplicity and clarity. FIG. 6A is an isometric illustration of a portion of the combustor panel 600 and FIG. 6B is a cross-sectional illustration of the combustor panel 600 as viewed along the line B-B shown in FIG. 6A.

As shown, the combustor panel 600 includes a peripheral rail 612, first webbing 610a, and second webbing 610b. A first boss 606 is located between the first webbing 610a and the second webbing 610b, the first boss 606 defining a first aperture 602, similar to that shown and described above. The first webbing 610a includes a web pocket 616 similar to that shown in FIGS. 5A-5D, the web pocket 616 fluidly connecting to and being a local extension of an annular channel 614 formed between the webbing 610a, 610b and the first boss 606. As schematically shown in FIGS. 6A-6B, the peripheral rail 612 has one or more rail through-holes 618 formed therethrough within the peripheral rail 612. The rail through-holes 618 provide fluid passage through a portion of the peripheral rail 612 that is adjacent the web pocket 616. The rail through-holes 618 can operate as venting holes through which air may pass into and/or out of the web pocket 616.

Figure 7A:
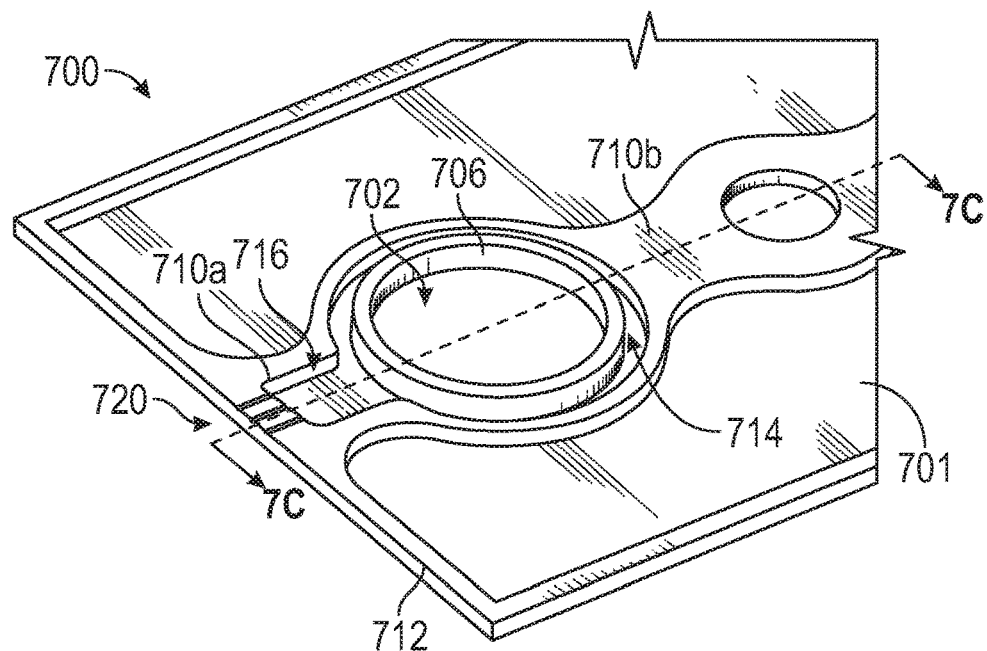
FIG. 7A is an isometric illustration of a combustor panel in accordance with an embodiment of the present disclosure.
Figure 7B:
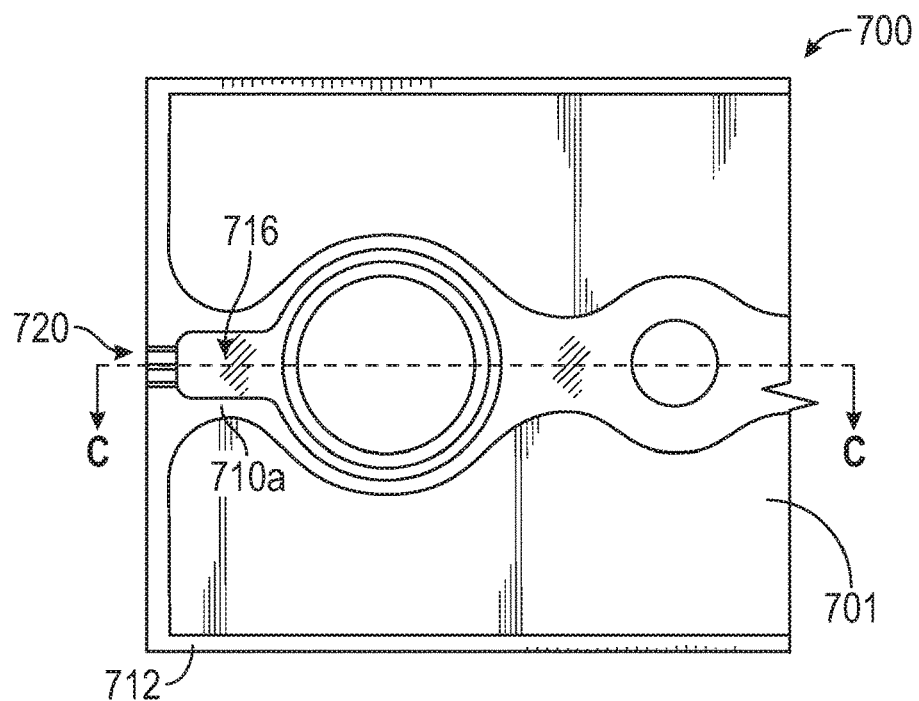
FIG. 7B is a plan view, schematic illustration of the combustor panel of FIG. 7A.
Figure 7C:
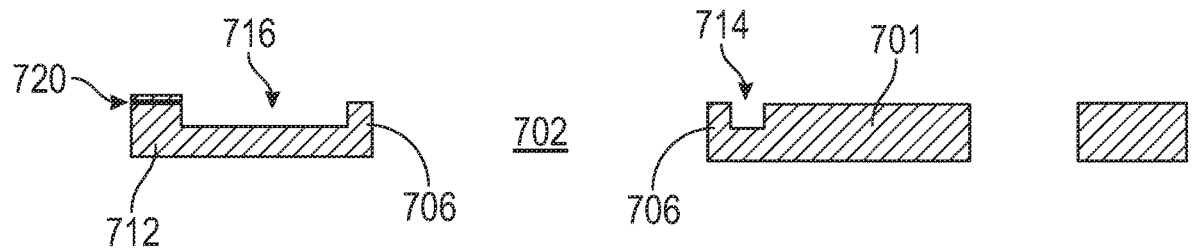
FIG. 7C is a cross-sectional illustration of the combustor panel of FIG. 7A as viewed along the line C-C shown in FIGS. 7A-7B.

Turning now to FIGS. 7A-7C, another alternative arrangement of a combustor panel 700 in accordance with an embodiment of the present disclosure is shown. The combustor panel 700 having a panel body 701 is substantially similar to that shown and described with respect to combustor panel 500 of FIGS. 5A-5D, and thus similar features will be labeled with similar reference numbers. Further, various elements that are schematically shown will not be labeled or described again for simplicity and clarity. FIG. 7A is an isometric illustration of a portion of the combustor panel 700, FIG. 7B is a top-down, plan view of the combustor panel 700, and FIG. 7C is a cross-sectional illustration of the combustor panel 700 as viewed along the line C-C shown in FIGS. 7A-7B.

As shown, the combustor panel 700 includes a peripheral rail 712, first webbing 710a, and second webbing 710b. A first boss 706 is located between the first webbing 710a and the second webbing 710b, the first boss 706 defining a first aperture 702, similar to that shown and described above. The first webbing 710a includes a web pocket 716 similar to that shown in FIGS. 5A-5D, the web pocket 716 fluidly connecting to and being a local extension of an annular channel 714 formed between the webbing 710a, 710b and the first boss 706. As schematically shown in FIGS. 7A-7C, the peripheral rail 712 has one or more rail cooling grooves 720 formed on a surface of the peripheral rail 712. The rail cooling grooves 720 provide fluid passage through a portion of the peripheral rail 712 that is adjacent the web pocket 716. The rail cooling grooves 720 can operate as venting holes through which air may pass into and/or out of the web pocket 716, similar to the rail through-holes 618 shown in FIGS. 6A-6B.

Figure 8A:
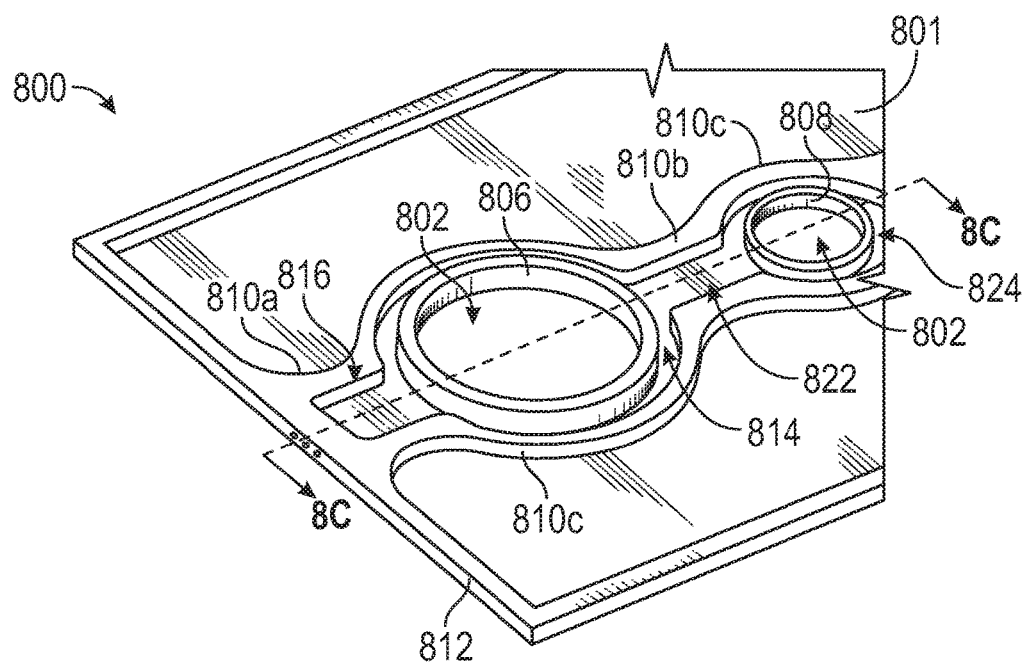
FIG. 8A is an isometric illustration of a combustor panel in accordance with an embodiment of the present disclosure.
Figure 8B:
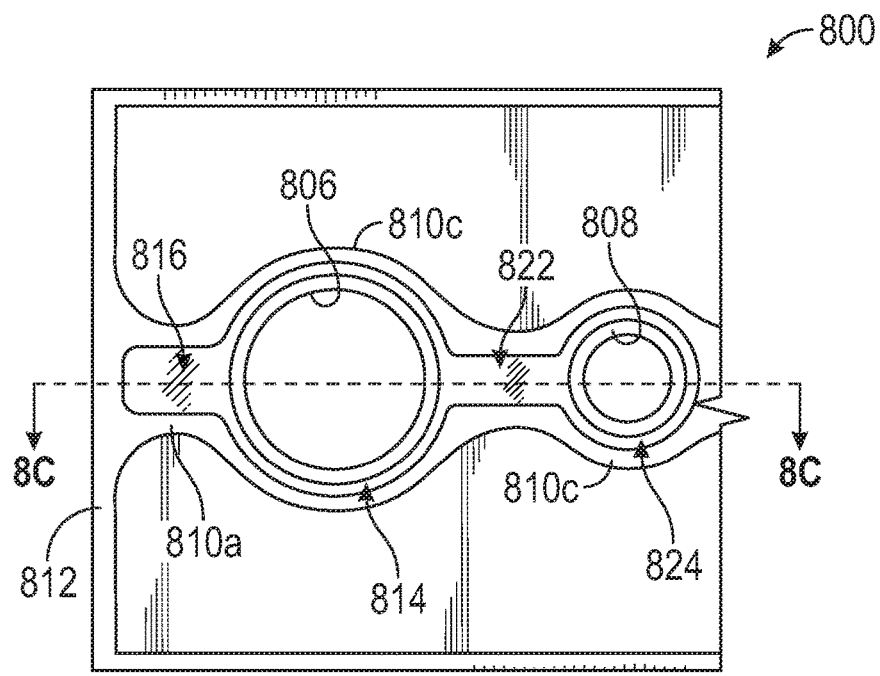
FIG. 8B is a plan view, schematic illustration of the combustor panel of FIG. 8A.
Figure 8C:
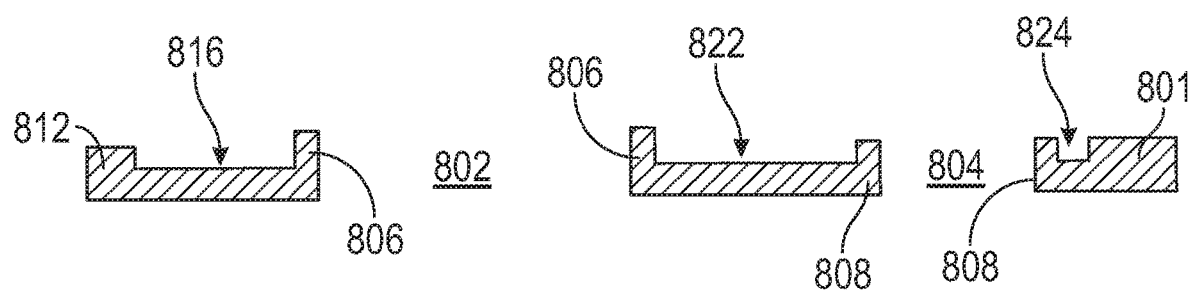
FIG. 8C is a cross-sectional illustration of the combustor panel of FIG. 8A as viewed along the line C-C shown in FIGS. 8A-8B.

Turning now to FIGS. 8A-8C, another alternative arrangement of a combustor panel 800 in accordance with an embodiment of the present disclosure is shown. The combustor panel 800 having a panel body 801 is substantially similar to that shown and described with respect to combustor panel 500 of FIGS. 5A-5D, and thus similar features will be labeled with similar reference numbers. Further, various elements that are schematically shown will not be labeled or described again for simplicity and clarity. FIG. 8A is an isometric illustration of a portion of the combustor panel 800, FIG. 8B is a top-down, plan view of the combustor panel 800, and FIG. 8C is a cross-sectional illustration of the combustor panel 800 as viewed along the line C-C shown in FIGS. 8A-8B.

As shown, the combustor panel 800 includes a peripheral rail 812, first webbing 810a, second webbing 810b, and third webbing 810c. A first boss 806 is located between the first webbing 810a and the second webbing 810b and is adjacent the peripheral rail 812. The first boss 806 defines a first aperture 802, similar to that shown and described above. A second boss 808 is surrounded by the second webbing 810b and is away from the peripheral rail 812 (i.e., within a central portion of the combustor panel 800). The second boss 808 defines a second aperture 804, similar to that shown and described above.

The first webbing 810a includes a first web pocket 816 similar the web pocket 516 between the first boss 506 and the rail 512 shown in FIGS. 5A-5D, The first web pocket 816 fluidly connects to and is a local extension of a first annular channel 814 formed between the webbing 810a, 810b, 810c and the first boss 806. As shown in FIGS. 8A-8C, the combustor panel 800 further includes a second web pocket 822 that is located within the second webbing 810b and extends between the first boss 806 and the second boss 808. Further, in this embodiment, the second boss 808 has a second annular channel 824 formed between a portion of the third webbing 810c and the second boss 808.

Figure 9:
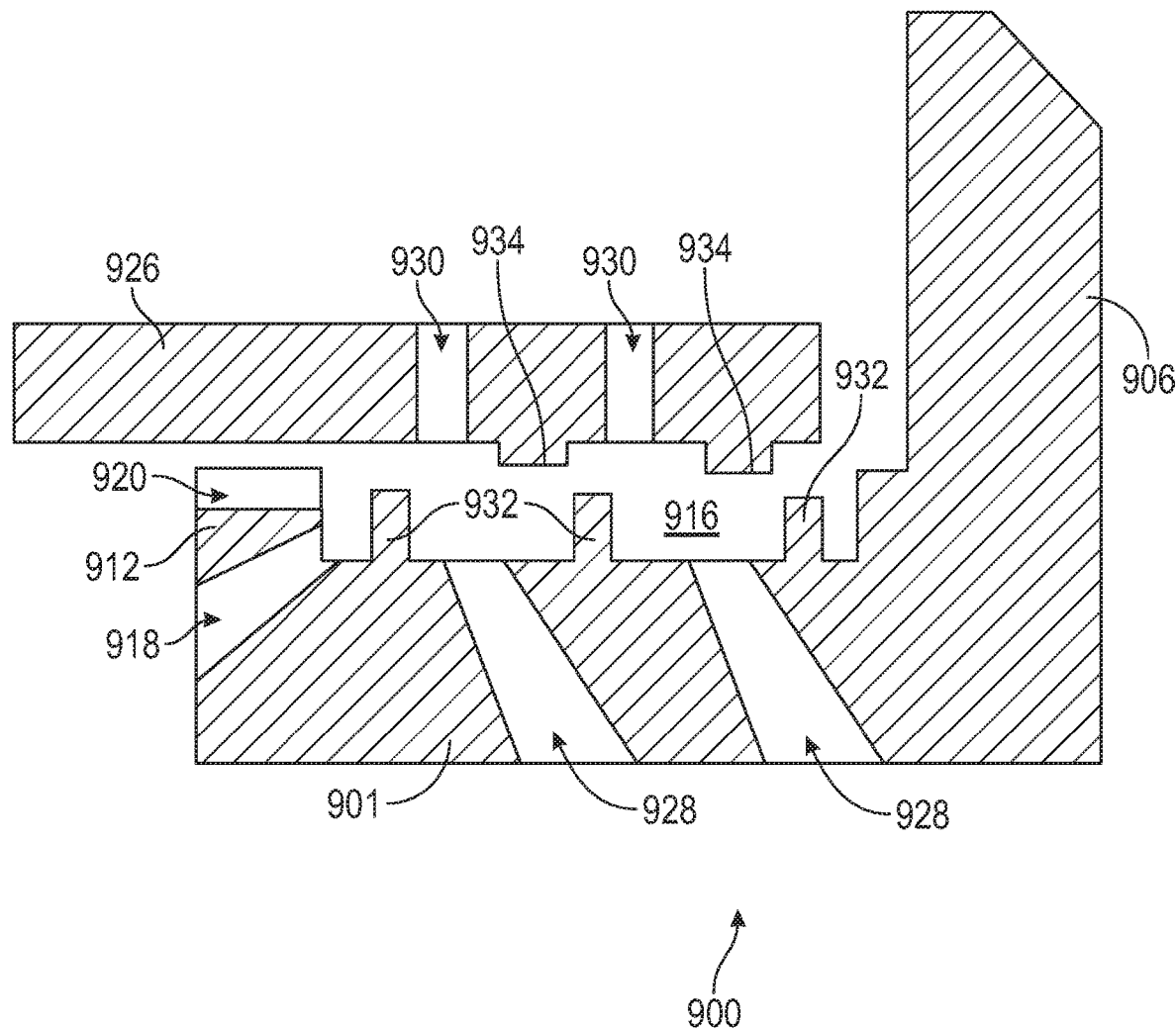
FIG. 9 is a schematic illustration of a combustor shell and combustor panel in accordance with an embodiment of the present disclosure.

Turning now to FIG. 9, an arrangement of a combustor panel 900 having a panel body 901 mounted to a combustor shell 926 in accordance with an embodiment of the present disclosure is shown. The combustor panel 900 is substantially similar to that shown and described with respect to combustor panels 500, 600, 700, 800 as described above and thus similar features will be labeled with similar reference numbers. Further, various elements that are schematically shown will not be labeled or described again for simplicity and clarity.

As shown, the combustor panel 900 includes a peripheral rail 712 and a boss 906 with a web pocket 916 located therebetween. The web pocket 916 fluidly connects to and is a local extension of an annular channel formed between webbing and the boss 906, as described above. As schematically shown in FIG. 9, the peripheral rail 912 includes both rail cooling grooves 920 formed on a surface of the rail 912 and a rail through-hole 918 formed therethrough. The rail cooling groove 920 and the rail through-hole 918 provide fluid passage through a portion of the peripheral rail 712 that is adjacent the web pocket 916. The rail cooling groove 920 and the rail through-hole 918 can operate as venting holes through which air may pass into and/or out of the web pocket 916.

Also shown in FIG. 9, the combustor panel 900 includes panel through-holes 928, which can allow for airflow into and/or out of the web pocket 916. Further, as shown, the combustor shell 926 includes shell through-holes 930, such as impingement holes. The shell through-holes 930 can provide cooling flow into the web pocket 916 from a cooling source that is exterior to the combustor shell 926. Additionally, as schematically shown in FIG. 9, optional heat augmentation features 932, 934 can be arranged within the web pocket 916. The heat augmentation features 932, 934 can be various structural elements that are positioned within the web pocket 916 when the combustor shell 926 and the combustor panel 900 are assembled. As shown, first heat augmentation features 932 are part of the combustor panel 900 and second heat augmentation features 934 are part of the combustor shell 926. The heat augmentation features 932, 934 can be pins, fins, ribs, or other structures, as will be appreciated by those of skill in the art.

Although various embodiments are shown and described herein, those of skill in the art will appreciate that variations thereon are possible without departing from the scope of the present disclosure. For example, various combinations of the features of the example embodiments described herein may be combined or features may be omitted therefrom. Further, as schematically shown in various embodiments of the present disclosure, the through-holes, grooves, apertures, cooling holes, etc. can be angled or otherwise geometrically arranged to achieve a desired cooling flow in and on the combustor components.

Advantageously, in accordance with some non-limiting embodiments, a combustor for a gas turbine engine includes a combustor panel having web pockets arranged to reduce or eliminate high temperature areas of the panels. By creating web pocket(s) in the webbing of the combustor panel, cooling holes can be drilled to manage local hot-spots. Such cooling can reduce local part temperatures and allow air to be angled in any direction required. Inclusion of either the local impingement holes or heat augmentation features (pins, fins, ribs, etc.) can increase the local heat rejection of the combustor panel at the webbing and further decrease local temperatures. Such decreases in temperature can result in longer part life.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A combustor panel for use in a gas turbine engine combustor, the combustor panel comprising:
   a panel body having a peripheral rail around a periphery of the panel body;
   a first boss formed on the panel body and surrounding a first aperture that passes through the panel body;
   a first webbing that extends from the peripheral rail toward the first boss, wherein a first annular channel is formed between the first webbing and the first boss and surrounds the first boss, and wherein a first web pocket is formed within the first webbing between the peripheral rail and the first boss and defines a local extension of the first annular channel extending from the first boss to the peripheral rail;

a second boss formed on the panel body and surrounding a second aperture that passes through the panel body; and a second webbing that extends from the first boss toward the second boss, wherein a second web pocket is formed within the second webbing between the first boss and the second boss and defines a local extension of the first annular channel extending from the first boss toward the second boss.

2. The combustor panel of claim 1, further comprising at least one rail through-hole providing fluid connection through the peripheral rail into the first web pocket.

3. The combustor panel of claim 1, further comprising at least one rail recess formed in a surface of the peripheral rail providing fluid connection through the peripheral rail into the first web pocket.

4. The combustor panel of claim 1, further comprising at least one panel through-hole providing fluid connection through the panel body into the first web pocket.

5. The combustor panel of claim 1, wherein the first aperture is a dilution hole of a combustor.

6. The combustor panel of claim 1, wherein a second annular channel is formed between the second webbing and the second boss and surrounds the second boss, and wherein the second web pocket is a local extension of the second annular channel.

7. The combustor panel of claim 1, further comprising a plurality of additional first bosses defining a plurality of respective first apertures and a plurality of additional second bosses defining a plurality of respective second apertures.

8. The combustor panel of claim 1, further comprising at least one heat transfer augmentation feature within the first web pocket.

9. The combustor panel of claim 8, wherein the at least one heat transfer augmentation feature comprises at least one of a pin, a fin, or a rib.

10. A combustor of a gas turbine engine, the combustor comprising:
a combustor shell; and
at least one combustor panel mounted to the combustor shell, the at least one combustor panel comprising:
a panel body having a peripheral rail around a periphery of the panel body;
a first boss formed on the panel body and surrounding a first aperture that passes through the panel body;
a first webbing that extends from the peripheral rail toward the first boss, wherein a first annular channel is formed between the first webbing and the first boss and surrounds the first boss, and wherein a first web pocket is formed within the first webbing between the peripheral rail and the first boss and defines a local extension of the first annular channel extending from the first boss to the peripheral rail,
a second boss formed on the panel body and surrounding a second aperture that passes through the panel body; and
a second webbing that extends from the first boss toward the second boss, wherein a second web pocket is formed within the second webbing between the first boss and the second boss and defines a local extension of the first annular channel extending from the first boss toward the second boss.

11. The combustor of claim 10, the panel body further comprising at least one rail through-hole providing fluid connection through the peripheral rail into the first web pocket.

12. The combustor of claim 10, the panel body further comprising at least one rail recess formed in a surface of the peripheral rail providing fluid connection through the peripheral rail into the first web pocket.

13. The combustor of claim 10, the panel body further comprising at least one panel through-hole providing fluid connection through the panel body into the first web pocket.

14. The combustor of claim 10, wherein the first aperture is a dilution hole of the combustor.

15. The combustor of claim 10, wherein a second annular channel is formed between the second webbing and the second boss and surrounds the second boss, and wherein the second web pocket is a local extension of the second annular channel.

16. The combustor of claim 10, further comprising at least one heat transfer augmentation feature within the first web pocket.

17. The combustor of claim 16, wherein the at least one heat transfer augmentation feature comprises at least one of a pin, a fin, or a rib.

18. The combustor of claim 16, wherein the at least one heat transfer augmentation feature comprises a heat transfer augmentation feature extending from the combustor shell into the first web pocket and a heat transfer augmentation feature extending from the panel body into the first web pocket.

19. A combustor of a gas turbine engine, the combustor comprising:
a combustor shell;
at least one combustor panel mounted to the combustor shell, the at least one combustor panel comprising:
a panel body having a peripheral rail around a periphery of the panel body; a first boss formed on the panel body and surrounding a first aperture that passes through the panel body;
a first webbing that extends from the peripheral rail toward the first boss, wherein a first annular channel is formed between the first webbing and the first boss and surrounds the first boss, and
wherein a first web pocket is formed within the first webbing between the peripheral rail and the first boss and defines a local extension of the first annular channel extending from the first boss to the peripheral rail; and
at least one heat transfer augmentation feature within the first web pocket, the at least one heat transfer augmentation feature comprising a heat transfer augmentation feature extending from the combustor shell into the first web pocket and a heat transfer augmentation feature extending from the panel body into the first web pocket.

20. The combustor of claim 19, the panel body further comprising at least one rail through-hole providing fluid connection through the peripheral rail into the first web pocket.

* * * * *